March 8, 1966

W. G. BUCHANAN
INDEX MECHANISM FOR GEAR SECTOR
CUTTING MACHINES AND THE LIKE 3,238,820

Filed Feb. 28, 1964

INVENTOR.
WILLIAM G. BUCHANAN
BY Richard W. Treverton
ATTORNEY

March 8, 1966

W. G. BUCHANAN 3,238,820

INDEX MECHANISM FOR GEAR SECTOR
CUTTING MACHINES AND THE LIKE

Filed Feb. 28, 1964

United States Patent Office 3,238,820
Patented Mar. 8, 1966

3,238,820
INDEX MECHANISM FOR GEAR SECTOR
CUTTING MACHINES AND THE LIKE
William G. Buchanan, Rochester, N.Y., assignor to The
Gleason Works, Rochester, N.Y., a corporation of New
York
Filed Feb. 28, 1964, Ser. No. 348,065
9 Claims. (Cl. 74—822)

The present invention relates to an indexing mechanism for machines adapted for cutting gear sectors and the like, and represents a modification of the indexing mechanism disclosed in application Serial No. 315,205 filed October 10, 1963 by T. A. Deprez.

According to that disclosure an index driven member secured to the work spindle of a gear tooth cutting machine is intermittently advanced by angular increments corresponding to the circular pitch of the work gear, such advance being effected by a fluid pressure operated piston acting through a rotary driver which has two diametrically opposed drive pins alternately engageable in radial slots in the driven member. On each indexing stroke the piston advances the driver through 180° to cause an advance of the driven member by one index pitch; on each of its return strokes the piston is free of the driver. At the conclusion of each such indexing advance a pawl is engaged with a locating or indexing formation on the driven member to complete the indexing of the spindle, and the latter is then clamped to its support prior to tooth cutting operation of the machine. After each such cutting operation the clamp is released, the pawl is disengaged, and the indexing operation is repeated to bring the next tooth space of a workpiece into cutting position.

In machines for cutting gear sectors, indexing is complicated by the fact that often the circular pitch or indexing angle is not a unit fraction of 360° and that sometimes the indexing angle is non-uniform. For example in automobile steering gear sectors the indexing angle is varied to provide a "fat" tooth at the center of the sector. To meet these conditions the index mechanism is arranged to return the spindle to the same starting position for the cutting of each sector.

The present invention provides a simple and effective means for so returning the spindle upon the release of the locating pawl which occurs after cutting of the last tooth slot of each sector, without requiring any modification in the action of the index driver. Accordingly, by simple interchange of parts of the mechanism the machine may be adapted for the cutting of either sectors or complete gears of whatever tooth number is desired.

An index mechanism according to the invention comprises an angularly movable driven member having a plurality of index formations spaced angularly thereabout, a first fluid pressure operated piston, drive means actuated by the piston for angularly advancing the driven member upon indexing strokes of the piston and for enabling return strokes of the piston free of the driven member, a pawl engageable with said index formations of the driven member, pawl actuating means coordinated with said piston to effect engagement and disengagement of the pawl respectively at the conclusion of and preceding each indexing stroke of the piston, a second fluid pressure operated piston connected with the driven member for effecting return angular movements thereof, and means for periodically interrupting operation of the pawl actuating means at the conclusion of an indexing stroke and before re-engagement of the pawl, and, concomitantly with such interruption, causing operation of said second piston to effect such return motion of the driven member.

A typical embodiment of the invention is shown in the accompanying drawings, wherein.

Figure 1:
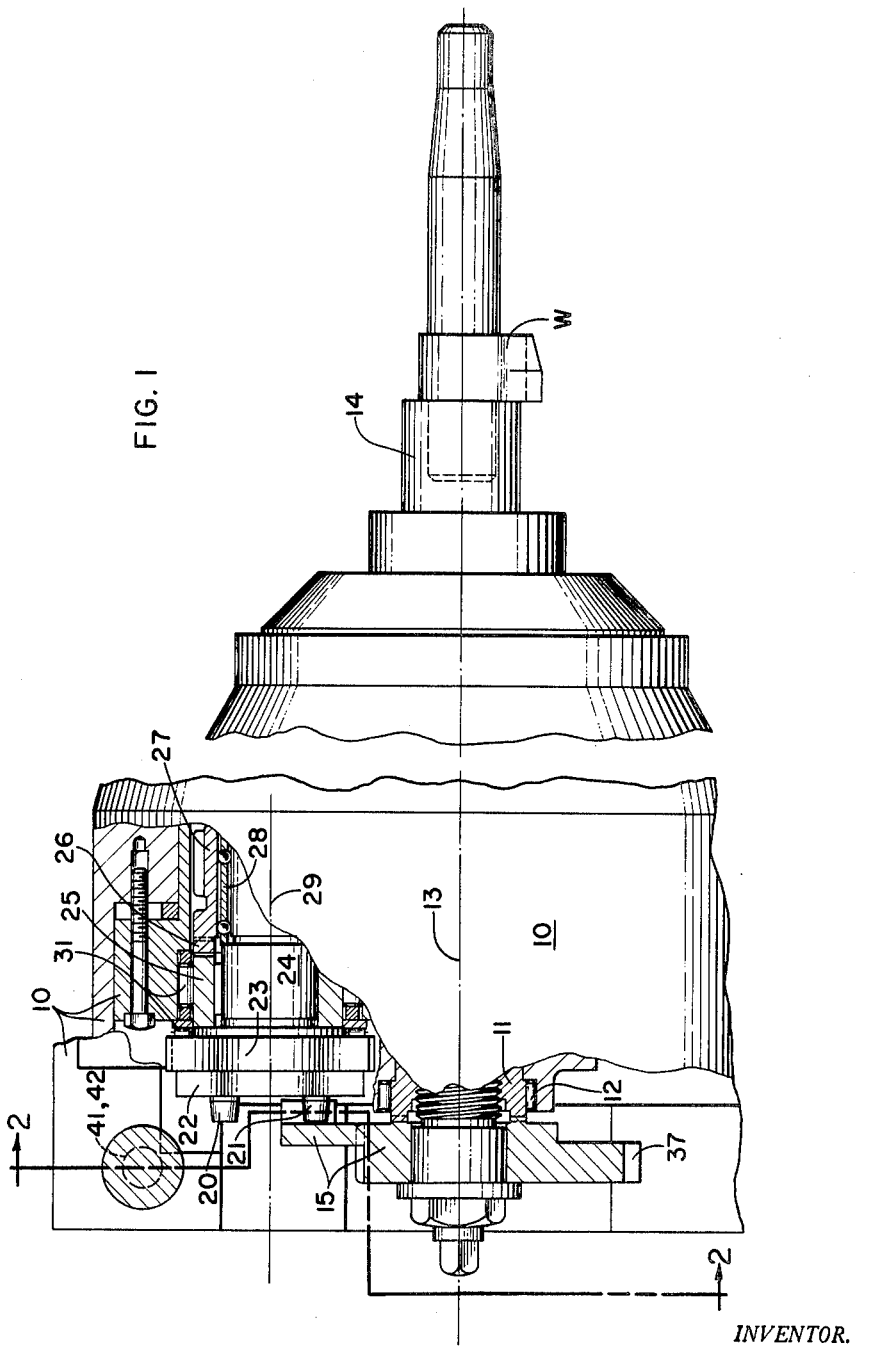
FIG. 1 is a fragmentary side view of the mechanism, partly in elevation and partly in section in the planes designated 1—1 in FIG. 2, which contain the axes of the driver and the driven member.

The mechanism shown comprises a multi-part housing 10 in which a work spindle 11 of a machine tool is rotatable on bearings 12 about axis 13. The spindle carries at one end a chuck 14 for a workpiece W, in this instance a steering gear sector in which four tooth slots are to be cut on the machine. The latter may be of the general kind disclosed in application Serial No. 337,121, filed by T. A. Deprez et al. on January 7, 1964, in which a rotary cutter cuts successive tooth slots during successive revolutions, and the work is indexed each time a gap between the last and first blades of the cutter comes abreast of the gap. On the end of the spindle 11 opposite to the chuck an index driven member 15 is rigidly but detachably secured. Member 15 has three spaced radial slots 17, 18 and 19 for alternate engagement by two diametrically opposed drive pins 20 and 21 on disc 22 of an index driver, the pins preferably being rollers mounted on the disc on anti-friction bearings. The disc is rigidly but detachably secured to flange 23 of a shaft 24 to which is secured a sleeve 25 that has ratchet face clutch teeth 26 meshing with like but opposing ratchet face clutch teeth on a pinion 27. A ball-sleeve bearing 28 supports the pinion for rotation and axial motion on shaft 24 about and along axis 29. Radial and axial thrust roller bearings 31 support the sleeve 25, and shaft 24, for rotation in housing 10.

Figure 2:
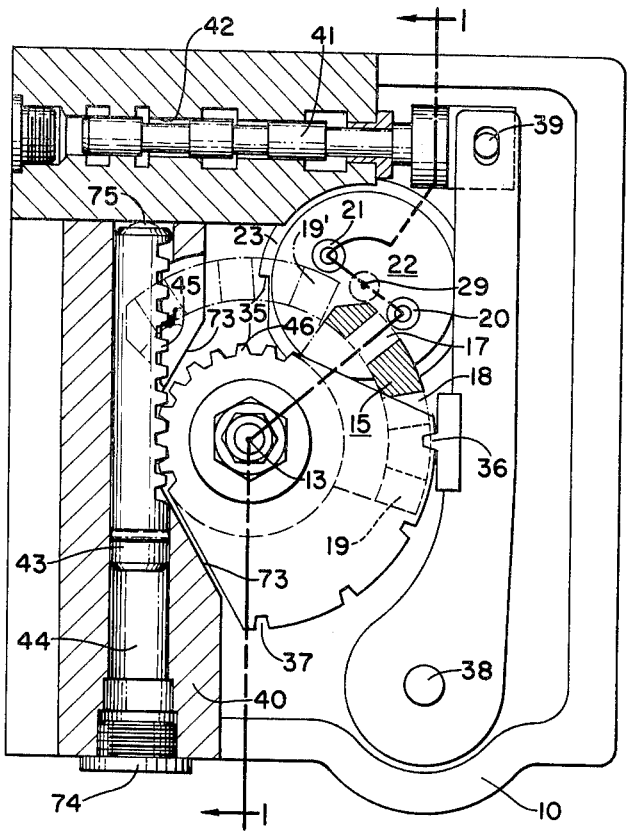
FIG. 2 is a cross-section in the planes designated 2—2 in FIG. 1.
Figure 3:
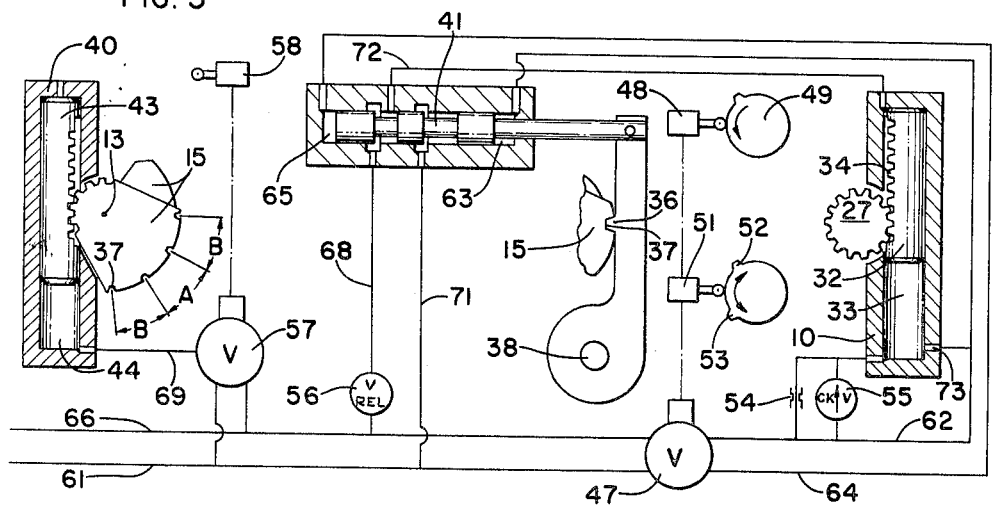
FIG. 3 is a schematic view illustrating the fluid pressure system and control means therefor.

The pinion 27 is rotated back and forth about its axis 29 by means of a piston 32, FIG. 3, which is reciprocated by fluid pressure in a cylinder 33 in the housing and has rack teeth 34 meshing with the pinion. On each stroke of the piston in one direction, downwardly in FIG. 3, the piston turns the pinion and driver 21, 22 clockwise (in FIGS. 2 and 3) through 180°, the ratchet teeth 26 on members 25 and 27 remaining engaged during such rotation. On each return stroke of the piston the ratchet teeth 26 cam apart, so that while the pinion is moved to the right (in FIG. 1) on sleeve 28 and is rotated counterclockwise through 180° the driver, 21, 22, remains stationary, preferably being held against counterclockwise rotation by a ratchet pawl, not shown, engaged in one of two diametrically opposed ratchet notches 35 in flange 23, FIG. 2. On each clockwise rotation of the driver one or the other of the drive pins 20 or 21 engages in one of the slots, 17, 18 or 19, of the driven member 15, and coarse indexes it together with the spindle and workpiece by one pitch.

At the conclusion of each such coarse indexing a pawl 36 engages one of a plurality of indexing formations, in this case tapered notches 37, in the index driven member 15, to effect final location or fine indexing of the spindle and workpiece. The pawl is pivoted by pin 38 to the housing 10 and at its distal end is pivotally connected by pin 39 to a hydraulic piston-valve 41 that is slidable in cylinder 42 in the housing. This piston-valve actuates the pawl and so coordinates its action with that of the piston 32 that the pawl is disengaged before each indexing stroke of the piston 32, and is engaged at the conclusion of each such stroke and remains engaged during the following return stroke of the piston.

The mechanism as thus far described with reference to the drawings is substantially the same, except for the number of slots 17–19 and notches 37, and the spacing of the latter, as that disclosed in afore-mentioned application Serial No. 315,205 to which reference may be made for related elements, including a spindle clamp which is released and applied in time with the indexing action. According to the present invention the notches 37 may be unequally spaced. For example, referring to FIG. 3 the angular spacing A of the two center slots 37 of the driven member, as measured about the axis 13, may be slightly greater than the spacing B of the end slots, to thereby cause a "fat" center tooth to be cut on the workpiece W. Moreover the angle A or B, or both, may or may not be a unit fraction of 360°, as desired. In a typical embodiment the angle A is approximately 28.5° and the angle B is 28°. The slots 17–19 have sufficient clearance relative to the rollers 20, 21 to accommodate this slight irregularity of 0.5° in the final indexing.

To effect return of the mechanism to the same starting position before cutting each workpiece, a piston 43 reciprocable in a cylinder bore 44, in a rigidly but detachably secured section 40 of housing 10, has rack teeth 45 meshing with pinion teeth 46 on the index driven member 15. The return motion is preceded by a 180° rotation of the driver which does not effect further counterclockwise advance of the driven member; and for this purpose the slot 19 is open on the clockwise side thereof (in FIG. 2). This means that when this slot has been advanced to the position shown in broken lines at 19', the driver 20–22 can rotate free of the driven member. The pins 20, 21 of the driver are so positioned on the disc 22 as to both be clear of the slots in driven member at the conclusion of each 180° rotation of the driver, as shown in FIG. 2, so as not to interfere with the clockwise return motion of the driven member.

Referring to FIG. 3, the control system for the mechanism includes a solenoid-operated reversing valve 47 controlled jointly by limit switches 48 and 51. Switch 48 is closed by a single-lobe cam 49 on the cutter spindle of the machine (not shown) at the completion of each revolution of the cutter. Switch 51 is a "maintain-contact" limit switch which is closed in either of two positions, and which remains closed in either such position until actuated to its other position. This switch is controlled by a cam on the work spindle having two lobes, 52 and 53. The switch arrangement is such that when cam lobe 52, rotating counterclockwise, engages the switch 51 the latter establishes a circuit in parallel with that through switch 48, to maintain the solenoid of valve 47 energized even though switch 48 opens, but that, when cam lobe 53 rotating clockwise engages the switch 51, the latter closes a circuit through the valve's solenoid winding in series with switch 48. Lobe 52 contacts the switch when the index driven member 15 is in its counterclockwise limit position (with slot 19 in broken-line position 19' in FIG. 2) and lobe 53 contacts it in the clockwise limit position of the driven member, the position shown in full lines in FIG. 2. The switch, 51, remains in the position to which it is operated by lobe 52 until it is actuated by lobe 53, and then remains in this latter position until again actuated by lobe 52. The control system for the mechanism also includes a restrictor 54; a check valve 55, a pressure relief valve 56; and a solenoid operated reversing valve 57 and a control switch 58 therefor that is closed upon dechucking of the work after withdrawal of the work spindle housing 10 from cutting to loading-unloading position.

At the beginning of operation, driver 20–22 and driven member 15 are in the relation shown in FIG. 2, for cutting of the first tooth slot. Valve 47 connects hydraulic pressure line 61 to line 62 so that pressure in piston-valve chamber 63 holds the pawl 36 engaged, and connects return line 64 from piston-valve chamber 65 to hydraulic exhaust line 66. Piston 32 is held in its upper limit position; piston-valve 41 connects the upper end of cylinder 33 to exhaust line 66 through lines 72 and 68. Valve 57 connects line 69 from one end of cylinder 44 to exhaust line 66; the opposite end of the cylinder is vented to the housing interior. After the first tooth slot has been cut, switch 48 closed by cam 49 reverses valve 47, so that piston valve 41 disengages pawl 36 and connects the pressure line 61 to the upper end of cylinder 33 through lines 71 and 72 so that the indexing stroke of piston 32 occurs. The final phase of this action is slowed by the piston closing port 73 so that exhausting fluid must pass restrictor 54. The stroke of piston 32 causes pin 20 to rotate, clockwise in FIG. 2, through 180°, thereby angularly advancing the driven member and spindle assembly 15, 11 by substantially one index pitch. As soon as cam 49 has passed switch 48 the latter again reverses valve 47 causing the piston-valve 41 to engage pawl 36 with the driven member, thereby effecting fine indexing and applying pressure to the bottom of cylinder 33. When the piston-valve engages the pawl with the driven member it also connects the upper end of the cylinder to the exhaust line, through lines 72 and 68, causing the upward or reset stroke of piston 32 to occur at a rate controlled by valve 56.

This indexing action is repeated after the second and third tooth slots are cut, but after the fourth slot is cut and cam 49 has closed switch 48 to thereby reverse valve 47 and so cause the fourth 180° rotation of the index driver 20–22, the cam lobe 52 also closes switch 51, so that the opening of switch 48, when the lobe of cam 49 has passed, has no immediate effect: the valve 47 remains in the condition wherein lines 64 and 62 are respectively connected to pressure and exhaust lines 61 and 66. Therefore after this fourth angular advance of driver 20–22, the pawl 36 remains disengaged. Moreover this fourth advance of the driver is without effect on the index driven assembly 15, 11 because of the open-sided form of slot 19, now in broken line position 19', FIG. 2. Momentarily this driven assembly is held against rotation by friction, including that imposed by piston 43. The work spindle housing 10 now is retracted on the machine to load-unload position and the work is dechucked. This action is concomitant with closing of switch 58 which reverses valve 57, thereby applying pressure through line 69 to cause the resetting of the driven assembly, clockwise in FIG. 2, to the position there shown, which is limited by abutment of a stop button 75 on the piston 43 with the end wall of cylinder bore 44. This opens switch 51 and causes valve 47 to reverse, connecting lines 62 and 64 respectively to pressure and exhaust, so that pawl 36 is engaged and piston 32 resets, thereby conditioning the mechanism for operation of the machine in the cutting of a fresh workpiece.

It will be apparent that by interchange of the index driven member 15 for another having a different number of radial slots 17–19 and notches 37, and a corresponding replacement of driver 20–22 and cam 52, 53, the mechanism may be readily adapted for the cutting of gear sectors having different numbers of tooth slots, or teeth of a different pitch, or both. To facilitate replacement of the driven member 15, the housing section 40 is provided with cut-out 73. If necessary, the piston-rack 43, 45 may be replaced also, upon removal of cylinder end plug 74. Also, by the substitution of a driven member 15 having thereabout a full complement of radial slots and notches as in afore-mentioned application Serial No. 315,-205, and a driver 20–22 of suitable dimensions, the mechanism may be adapted for the cutting of complete gears by simply removing the housing section 40 and piston 43 and by disabling switches 51 and 58 so that valve 47 is controlled only by switch 48 and that passage 69 remains disconnected from pressure line 61.

Having now described a preferred embodiment of the invention, and its mode of operation, what I claim is:

1. An index mechanism comprising an angularly movable driven member having a plurality of index formations spaced angularly thereabout, a first fluid pressure operated piston, drive means actuated by the piston for angularly advancing the driven member upon indexing strokes of the piston and for enabling return strokes of the piston free of the driven member, a pawl engageable with said index formations of the driven member and pawl actuating means coordinated with said piston to effect engagement and disengagement of the pawl respectively at the conclusion of and preceding each indexing stroke of the piston, a second fluid pressure operated piston connected with the driven member for effecting return angular movements thereof, and means for periodically interrupting operation of the pawl actuating means at the conclusion of an indexing stroke and before re-engagement of the pawl, and, concomitantly with such interruption, causing operation of said second piston to effect such return motion of the driven member.

2. A mechanism according to claim 1 in which said driven member has a plurality of radial slots, said drive means comprises a rotary element advanced 180° upon each indexing stroke of the first piston and free of the latter during its return strokes, said element having thereon a pair of diametrically opposed pins engageable successively in said slots, and said pins both being clear of said slots at the conclusion of each such 180° advance.

3. A mechanism according to claim 2 in which the last slot engaged by said pins before return motion of the driven member is open-sided, to permit further rotation of the driver without further advance of the driven member.

4. A mechanism according to claim 1 in which the angular spacing of said index formations about the axis of the driven member is not a unit fraction of 360°.

5. A mechanism according to claim 1 in which said index formations are unequally spaced about the axis of the driven member.

6. An index mechanism comprising an angularly movable driven member having thereabout a plurality of radial slots, a rotatable index driver having thereon a pair of diametrically opposed pins engageable successively in the slots, and means for rotating said driver through increments of 180° which terminate with both pins clear of said slots, the one of said slots which is last in the direction of indexing motion of the driven member being open-sided to enable rotation of the driver without further advance of the driven member.

7. A mechanism according to claim 6 having means to return said driven member from its terminal index position to its initial index position.

8. A mechanism according to claim 7 in which said driven member has a plurality of index formations spaced angularly thereabout, and the mechanism comprises a pawl for engagement successively with said formations and pawl actuating means coordinated with rotation of the driver for effecting engagement and disengagement of said pawl.

9. A mechanism according to claim 8 having means for so coordinating said means to return said driven member with said pawl actuating means that the return of the driven member is effected while the pawl is disengaged subsequent to its engagement with the last one of said indexing formations.

References Cited by the Applicant

UNITED STATES PATENTS

| | | |
|---|---|---|
| 2,188,996 | 2/1940 | Carlsen. |
| 2,831,374 | 4/1958 | Fowler et al. |
| 2,898,780 | 8/1959 | Carlsen et al. |
| 3,139,194 | 6/1964 | Howing. |
| 3,166,954 | 1/1965 | Fowler et al. |

BROUGHTON G. DURHAM, *Primary Examiner.*